United States Patent
Li et al.

(10) Patent No.: US 6,936,559 B2
(45) Date of Patent: Aug. 30, 2005

(54) TUNABLE DEVICES INCORPORATING CACU3TI4O12

(75) Inventors: Dong Li, Tempe, AZ (US); Munirpallam Appador Subramanian, Kennett Square, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/258,258

(22) PCT Filed: May 3, 2001

(86) PCT No.: PCT/US01/14297

§ 371 (c)(1),
(2), (4) Date: Apr. 16, 2003

(87) PCT Pub. No.: WO01/84572

PCT Pub. Date: Nov. 8, 2001

(65) Prior Publication Data

US 2004/0127345 A1 Jul. 1, 2004

Related U.S. Application Data

(60) Provisional application No. 60/201,808, filed on May 4, 2000.

(51) Int. Cl.$^7$ .............................. H01G 4/12; H01G 7/06
(52) U.S. Cl. ..................... 501/136; 315/5.46; 315/5.53; 333/205; 333/207; 333/209
(58) Field of Search ........................ 501/136; 315/2.21, 315/5.46, 5.53; 333/205, 207, 209; 455/87

(56) References Cited

U.S. PATENT DOCUMENTS 5,472,935 A      12/1995  Yandrofski et al.

OTHER PUBLICATIONS

Subramian et al "High Dielectric Constant in ACu3Ti4O12 and ACu3Ti3FeO12 Phases", Journal of Solid State Chem, 151, 323–325 May 2, 2000.*

Crystallographic and magnetic structures of materials with threefold orbital degeneracy. Application to calcium tricuprotetratitanateJournal of Physics C: Solid State Physics (1980), 13(27), 5125–36. Abstract Only.*

Stability of the crystal structures and the preparation conditions of the perovskites AC3B4O12 Author(s): Troyanchuk, I.O. ; Izvestiya Akademii Nauk SSSR, Neorganicheskie Materialy (1988), 24(5), 840–2. Abstract Only.*

Magnetic properties and structure of calcium copper titanium oxide (CaCu3Ti4O12), a perovskite structure Author(s): Collomb, A.; Physica Status Solidi A: Applied Research (1977), 41(2), 459–63. Abstract Only.*

Magnetic structures of some [AC3](B4)O12 compounds with a perovskite–like strucure Author(s): Collomb, A.; Physica B+C: Physics of Condensed Matter + Atomic, Molecular and Plasma Physics, Optics (Amsterdam). Abstract Only.*

Substitution of copper for a divalent metal in perovskite–type titanates Author(s): Deschanvres, Alfred; Bulletin de la Societe Chimique de France (1967), (11), 4077–8. Abstract Only.*

B. Bochu, et al. Synthese at caracterisation d'une serie de titanates perowskites isotypes de [CaCu3](Mn4)O12, Journal of Solid State Chemistry, (1979), pp. 291–298, vol. 29.

A. Deschanvres, et al. Replacement de metal bivalent par le cuivre dans les titanates de type Perowskite, Bulletin De La Societe Chmique, (1967), pp. 4077–4078, vol. 11.

* cited by examiner

Primary Examiner—Matt Kopec

(57) ABSTRACT

This invention provides tunable devices incorporating the dielectric $CaCu_3Ti_4O_{12}$. $CaCu_3Ti_4O_{12}$ is especially useful in tunable devices such as phase shifters, matching networks, oscillators, filters, resonators, and antennas comprising interdigital and trilayer capacitors, coplanar waveguides and microstrips.

2 Claims, No Drawings

TUNABLE DEVICES INCORPORATING CACU3TI4O12

This application claims the benefit of U.S. Provisional Application No. 60/201,808, filed on May 4, 2000.

FIELD OF THE INVENTION

This invention provides tunable devices incorporating the dielectric material $CaCu_3Ti_4O_{12}$.

BACKGROUND OF THE INVENTION

The use of dielectric materials to increase capacitance is well known and long-used. Earlier capacitor dielectrics fell into two categories. The first category of dielectrics has a relatively temperature-independent dielectric constant but the value of the dielectric constant is low, e.g., 5–10. Materials such as electrical porcelain and mica fall in this category. The second category of dielectrics has very high dielectric constant, e.g., 1000 or more, but they are quite temperature dependent. An example is barium titanate, $BaTiO_3$.

Since the capacitance is proportional to the dielectric constant, high dielectric constant materials are desired. In order to perform acceptably in tuning or resonance circuits the dielectric must have a dielectric constant that exhibits minimal temperature dependence; otherwise small changes in ambient temperature throw the circuit out of resonance. Other applications require a dielectric constant that exhibits minimal frequency dependence. It is also desirable to have the loss or dissipation factor as small as possible.

For many microwave devices the important material features are the dielectric tunability, i. e., the change in dielectric constant with applied voltage, and low dielectric loss. Barium strontium titanate, $Ba_{1-x}Sr_xTiO_3$, has been used in some such applications but the need persists for materials with better properties.

Deschanvres et al., *Bull. Soc. Chim. Fr.* 4077 (1967) report the preparation of CaCu3Ti4O12 with the perovskite structure and a lattice constant of 0.7393 nm.

Bochu et al., *J. Solid State Chem.* 29, 291 (1979) disclose the synthesis and structure of $CaCu_3Ti_4O_{12}$ and related titanates and report the lattice constant to be 0.7391 nm.

Yandrofski et al., U.S. Pat. No. 5,472,935, disclose tunable microwave and millimeter wave devices incorporating tunable ferroelectrics.

SUMMARY OF THE INVENTION

This invention provides tunable devices incorporating the dielectric $CaCu_3Ti_4O_{12}$. $CaCu_3Ti_4O_{12}$ is especially useful in tunable devices such as phase shifters, matching networks, oscillators, filters, resonators, and antennas comprising interdigital and trilayer capacitors, coplanar waveguides and microstrips.

This invention also provides electrical devices requiring a dielectric material with a dielectric constant above 9000 wherein the dielectric is $CaCu_3Ti_4O_{12}$.

DETAILED DESCRIPTION $CaCu_3Ti_4O_{12}$ has dielectric properties that provide advantages in devices requiring a high dielectric constant as well as in tunable devices. $CaCu_3Ti_4O_{12}$ has a dielectric constant above 9000 over a frequency range of 1 kHz to 1 MHz.

$CaCu_3Ti_4O_{12}$ can be synthesized by the following procedure. Stoichiometric amounts of the precursors are thoroughly mixed. The precursors $CaCO_3$, CuO and $TiO_2$ are preferred. The mixed precursor powder is calcined at about 1000° C. for about 12 hours. The calcined powder is reground and pressed to 12.7 mm diameter/1–2 mm thick disks. The disks are sintered in air at about 1100° C. for 24 hours. In both the calcining and sintering steps, the temperature ramping up rate is about 200° C./hour from room temperature, i.e., about 20° C., to the calcining or sintering temperature and the cooling rate is about 150° C./hour from the calcining or sintering temperature to room temperature, i.e., about 20° C.

$CaCu_3Ti_4O_{12}$ crystallizes in a cubic perovskite Im3 structure.

Dielectric measurements were carried out on the disk samples. The faces of the disk-shaped samples were polished with a fine-grit sand or emery paper. Silver paint electrodes were applied on the faces and dried at 70–100° C. The capacitance and the dielectric loss measurements were performed by the two-terminal method using Hewlett-Packard 4275A and 4284A LCR bridges at a temperature of 25° C. over a frequency range of from 1 kHz to 1 MHz. The capacitance, C, and the dissipation factor are read directly from the bridge. The dielectric constant (K) was calculated from the measured capacitance, C in picofarads, from the relationship, $K=(100\ Ct)/(8.854\ A)$, where t is thickness of the disk shaped sample in cm and A is the area of the electrode in $cm^2$. Voltages were applied across the flat electroded faces of the disks and tunability was calculated by measuring the change in dielectric constant with applied voltage. The tunability, T, is calculated from the equation $T=[K(0)-K(V)]/K(0)$] where $K(0)$ is the dielectric constant when there is no applied voltage and $K(V)$ is the dielectric constant when there is an applied voltage V. The tunability is usually expressed as a percent for a given applied electric field so that the above result for T is multiplied by 100 or it is written as T=(constant) E where T is the tunability in %, E is the electric field and the constant is characteristic of the particular material.

EXAMPLE OF THE INVENTION $CaCu_3Ti_4O_{12}$ was prepared by the following procedure. Appropriate amounts of the starting carbonate and oxides $CaCO_3$, CuO and $TiO_2$ were weighed according to the stoichiometric ratios and mixed thoroughly in an agate mortar. The gram amounts of the precursors used are shown in Table 1. The mixed powder was calcined at 1000° C. for 12 hours. The calcined powder was reground and pressed to 12.7 mm diameter/1–2 mm thick disks. The disks were sintered in air at 1100° C. for 24 hours. In both the calcining and sintering steps, the temperature was increased from room temperature, i.e., about 20° C., to the calcining or sintering temperature at a rate of 200° C./hour and the temperature was decreased from the calcining or sintering temperature to room temperature, i.e., about 20° C., at a rate of 150° C./hour.

X-ray powder diffraction patterns were recorded with a Siemens D5000 diffractometer. The data showed that $CaCu_3Ti_4O_{12}$ crystallized in a cubic perovskite related Im3 structure. The measured lattice parameter and the literature value are listed in Table 1.

TABLE 1

| | |
|---|---|
| $CaCO_3$ | 0.2502 g |
| CuO | 0.5966 g |

TABLE 1-continued

| | |
|---|---|
| $TiO_2$ | 0.799 g |
| a, measured lattice parameter | .7391(1) nm |
| a, literature value lattice parameter | .7391 nm |

The disk samples were polished to produce flat uniform surfaces and electroded with silver paint. The painted samples were dried at 70–100° C. overnight. Capacitance and loss tangent measurements were taken on a HP-4284A LCR meter at room temperature, i.e., about 20° C., over a frequency range of from 1 kHz to 1 MHz. The results are shown in Table 2.

TABLE 2

| Frequency (Hz) | Dielectric Constant | Loss Tangent |
|---|---|---|
| 1 k | 12334 | 0.105 |
| 10 k | 11087 | 0.0695 |
| 100 k | 10286 | 0.0674 |
| 1 M | 9211 | 0.232 |

Voltages up to 100V were applied across the flat electroded faces of the disks using an Keithley 228A voltage/current source and the dielectric constant was measured as a function of applied voltage at room temperature using a HP-4275A LCR meter. The percent tunability and the applied electric filed to obtain that magnitude tunability are shown in Table 3 over a frequency range of from 1 kHz to 1 MHz. The tunability equation written in the form T=(constant) E is also given in Table 3 for each frequency.

TABLE 3

| Electric Field (V/$\mu$m) | Frequency | | | |
|---|---|---|---|---|
| | 10 k | 100 k | 1 M | 10 M |
| 0 | 0.000 | 0.000 | 0.000 | 0.000 |
| 0.017182 | 1.149 | 1.015 | 0.805 | 0.328 |
| 0.034364 | 2.546 | 2.258 | 1.849 | 0.786 |
| 0.051546 | 3.924 | 3.491 | 2.926 | 1.290 |
| 0.068729 | 5.244 | 4.676 | 3.896 | 1.841 |
| 0.081615 | 6.201 | 5.536 | 4.627 | 2.182 |
| Tunability | T = 77.0 × E | T = 68.8 × E | T = 57.7 × E | T = 27.5 × E |

(T: tunability in %, E: electric field in V/$\mu$m)

The results show that $CaCu_3Ti_4O_{12}$ has a high tunability along with a high dielectric constant.

What is claimed is:

1. A tunable electric device comprising $CaCu_3Ti_4O_{12}$.
2. A tunable electrical device requiring a dielectric material with a dielectric constant above 9000 comprising the dielectric $CaCu_3Ti_4O_{12}$.

* * * * *